US009325607B2

(12) United States Patent
Yabusaki et al.

(10) Patent No.: US 9,325,607 B2
(45) Date of Patent: *Apr. 26, 2016

(54) TRANSPORT CONTROL SERVER, TRANSPORT CONTROL SYSTEM, AND BACKUP PATH SETTING METHOD

(71) Applicant: Hitachi, Ltd., Tokyo (JP)

(72) Inventors: Hitoshi Yabusaki, Kawasaki (JP); Daisuke Matsubara, Tachikawa (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,613

(22) Filed: Aug. 19, 2014

(65) Prior Publication Data

US 2014/0355426 A1 Dec. 4, 2014

Related U.S. Application Data

(63) Continuation of application No. 12/852,310, filed on Aug. 6, 2010, now Pat. No. 8,811,149.

(30) Foreign Application Priority Data

Aug. 14, 2009 (JP) ................................ 2009-188051

(51) Int. Cl.

| | |
|---|---|
| ***H04L 29/14*** | (2006.01) |
| ***H04L 12/707*** | (2013.01) |
| ***H04L 12/751*** | (2013.01) |
| ***H04L 12/729*** | (2013.01) |
| ***H04L 12/703*** | (2013.01) |
| ***H04L 12/717*** | (2013.01) |
| ***H04L 12/24*** | (2006.01) |

(52) U.S. Cl.

CPC ............ *H04L 45/22* (2013.01); *H04L 41/0654* (2013.01); *H04L 45/02* (2013.01); *H04L 45/125* (2013.01); *H04L 45/28* (2013.01); *H04L 45/42* (2013.01)

(58) Field of Classification Search

None

See application file for complete search history.

(56) References Cited

U.S. PATENT DOCUMENTS

| | | | |
|---|---|---|---|
| 7,248,561 | B2 | 7/2007 | Ishibashi et al. |
| 7,859,993 | B1 | 12/2010 | Choudhury et al. |
| 8,068,411 | B2 | 11/2011 | Vasseur et al. |

(Continued)

FOREIGN PATENT DOCUMENTS

| | | | |
|---|---|---|---|
| CN | 101471693 | | 7/2009 |
| EP | 2023549 | | 2/2009 |
| EP | 2159957 | A1 * | 3/2010 |
| JP | 2003-229889 | | 8/2003 |

(Continued)

*Primary Examiner* — Robert C Scheibel

(74) *Attorney, Agent, or Firm* — Baker Botts L.L.P.

(57) ABSTRACT

Transport control server (TCS) in a network system including a first backup path (FBP) with predetermined first bandwidth (PFB) secured or reserved between any node pair, second backup path (SBP) with predetermined second bandwidth (PSB) secured or reserved between any node pair, the FBP and SBP sharing a link, each node forwards data according to path setting information. The TCS including: a storage section storing, for each path, an identifier for each node through which the path passes; and a control processing section performing: upon switchover of first active path to FBP, judging whether PSB of SBP can be secured or reserved by the bandwidth of the shared link through which the FBP passes, by referring to the storage section; if not, identifying nodes through which the SBP passes, by referring to the storage section; and transmitting a setting change notification to delete the SBP to the identified nodes.

9 Claims, 16 Drawing Sheets

OVERALL NETWORK ARCHITECTURE

(56) References Cited

U.S. PATENT DOCUMENTS

| | | | |
|---|---|---|---|
| 2003/0147352 | A1 | 8/2003 | Ishibashi et al. |
| 2003/0174644 | A1 | 9/2003 | Yagyu |
| 2006/0114818 | A1 | 6/2006 | Canali et al. |
| 2010/0232287 | A1 | 9/2010 | Long et al. |

FOREIGN PATENT DOCUMENTS

| | | |
|---|---|---|
| JP | 2003-273904 | 9/2003 |
| JP | 2005-210514 | 8/2005 |
| WO | WO 2009/092249 | 7/2009 |

* cited by examiner

OVERALL NETWORK ARCHITECTURE

SERVER-CENTRIC MANAGEMENT BY TRANSPORT CONTROL SERVER

FORWARDING DATABASE (FD) CHANGE NOTIFICATION UPON A FAULT OCCURRING

FORWARDING DATABASE (FD) CHANGE NOTIFICATION UPON A PATH CHANGE

STRUCTURAL DIAGRAM OF TRANSPORT CONTROL SERVER

| ACTIVE PATH ID | ENDPOINT NODE | | STANDBY PATH | | CANDIDATE PATH ID | | | BANDWIDTH OF PATH |
|---|---|---|---|---|---|---|---|---|
| | | | STANDBY PATH ID | BANDWIDTH SHARING | | | | |
| A | E1 | E2 | B | ○ | E | | | 20M |
| F | E2 | E4 | C | ○ | D | G | | 10M |
| | | | | | | | | |
| | | | | | | | | |

| PATH ID | TRANSIT NODE | | | | | | TRANSIT LINK | | | | |
|---|---|---|---|---|---|---|---|---|---|---|---|
| A | E1 | C1 | C2 | C3 | E3 | | a | e | k | c | |
| B | E1 | C1 | C5 | C3 | E3 | | a | d | j | l | |
| C | E2 | C2 | C5 | C3 | E4 | | b | g | j | l | |
| D | E2 | C2 | C5 | C4 | C3 | E4 | b | g | f | i | l |
| | | | | | | | | | | | |
| | | | | | | | | | | | |

| PATH ID | TRANSIT NODE | INPUT LABEL & INTERFACE | OUTPUT LABEL & INTERFACE |
|---|---|---|---|
| A | E1 | 3, eth0 | 2, eth2 |
| | C1 | 4, eth3 | 1, eth0 |
| | C2 | 4, eth4 | 13, eth2 |
| | C3 | 11, eth5 | 15, eth3 |
| | | | |
| B | | | |
| | | | |

| LINK ID (408) | OPERATING STATUS (409) | LINK BANDWIDTH (410) | UNRESERVED BANDWIDTH (411) | ACTUALLY USED BANDWIDTH (412) | AUXILIARY BANDWIDTH (413) | | | | | PATH ID OF PATH PASSING THROUGH LINK (417) | | | | | |
|---|---|---|---|---|---|---|---|---|---|---|---|---|---|---|---|
| | | | | | OCCUPIED BANDWIDTH (414) | SHARED BANDWIDTH (415) | | | | ACTIVE PATH ID (401) | STANDBY PATH ID (418) | | | | CANDIDATE PATH ID (404) |
| | | | | | | SR G1 | SR G2 | SR G3 | SR G4 | | OCCUPIED | SRG1 | SRG2 | SRG3 | |
| a | ○ | 100M | 80M | 20M | 0M | 0M | 0M | 0M | 0M | A | | B | | | |
| b | ○ | 100M | 90M | 0M | 0M | 0M | 10M | 0M | 0M | | | | C | | |
| c | ○ | 100M | 80M | 20M | 0M | 0M | 0M | 0M | 0M | A | | B | | | |
| d | ○ | 100M | 80M | 20M | 0M | 20M | 0M | 0M | 0M | | | B | | | |
| | | | | | | | | | | | | | | | |
| | | | | | | | | | | | | | | | |

OPERATION OF AN EDGE NODE WHEN THE EDGE NODE CHANGES PATH

PATH CHANGE

TRANSPORT CONTROL SERVER, TRANSPORT CONTROL SYSTEM, AND BACKUP PATH SETTING METHOD

CROSS REFERENCE TO RELATED APPLICATION

This is a continuation of U.S. application Ser. No. 12/852,310, filed Aug. 6, 2010 (now U.S. Pat. No. 8,811,149), which application is related to U.S. application Ser. No. 12/637,929, filed Dec. 15, 2009 (now U.S. Pat. No. 8,547,850). This application relates to and claims priority from Japanese Patent Application No. 2009-188051, filed on Aug. 14, 2009. The entirety of the contents and subject matter of all of the above is incorporated herein by reference.

FIELD OF THE INVENTION

The present invention relates to a transport control server (TCS), a transport control system, and a backup path setting method. In particular, the invention relates to a transport control server, a transport control system, and a backup path setting method, in a system where plural backup paths may share a link, for carrying out setting change in nodes along a path affected by a path switchover, when a path change is made by a node or when anode autonomously performs switching from an actually used path (active path) to an auxiliary path (backup path) due to a fault or congestion occurring.

BACKGROUND OF THE INVENTION

Path mechanisms such as MPLS (Multi-Protocol Label Switching), GMPLS (Generalized MPLS), MPLS-TP (MPLS Transfer Profile), and PBB-TE (Provider Backbone Bridge Traffic Engineering) have heretofore been proposed. In a network using such a path mechanism, link sharing in which plural backup paths may share the bandwidth of a link is proposed with the aim of efficient link bandwidth utilization (refer to IETF, "RSVP-TE Extensions For Shared-mesh Restoration in Transport Networks", Internet-Drafts December 2001). In the link sharing, all backup paths are set up so that their bandwidths are guaranteed in case of faults occurring, if not exceeding a predetermined number of faults. This approach allows plural backup paths having different endpoints, respectively, to share the bandwidth of a link and, therefore, provides more efficient bandwidth utilization than path sharing in which plural active paths may share a backup path (refer to IETF, "Framework for Multi-Protocol Label Switching (MPLS)-based Recovery", RFC 3469, February 2003).

Some techniques related to the link sharing have heretofore been disclosed, which are enumerated below: a method for advertising a shared bandwidth and a method for calculating a route (refer to JP-A No. 2003-273904); a method for setting up a high priority path preferentially in case of a fault occurring and a method for path setting by a centralized control server (refer to JP-A No. 2003-229889); and a path setting method taking wavelength into account (refer to JP-A No. 2005-210514).

SUMMARY OF THE INVENTION

JP-A No. 2003-273904 suggests a method in which each node maintains shared bandwidth information in a network and calculates an available backup path. In the network where plural backup paths may share the bandwidth of a link, consistent bandwidth information must be maintained on the nodes in the same network. If not so, multiple faults occurring may result in a possibility that a total of the bandwidths of plural backup paths exceeds the bandwidth for the backup paths allocated to a link. In this case, path switchover to a backup path through the link may cause congestion on that link. To avoid such condition, shared bandwidth information maintained by a node must be consistent with shared bandwidth information maintained by other nodes in the same network. Therefore, each time an edge node sets up or changes an outgoing path from it, the edge node needs to advertise shared bandwidth information to all other nodes and the nodes receiving this advertisement need to update the shared bandwidth information maintained therein. Consequently, the occurrence of a link fault or node fault causes a number of path changes and, therefore, a number of advertisements are transmitted mutually. Whenever receiving an advertisement, each node updates the shared bandwidth information. A problem is an increase in the processing loads of the nodes.

JP-A No. 2003-229889 suggests a method in which a transport control server manages the shared bandwidths of links, wherein, however, the labels of backup paths are not distributed. In order to makes a faster recovery from a fault, the labels of paths need to be preconfigured in nodes so that anode can autonomously switch over to a backup path upon a fault occurring. However, in a case where these labels are preconfigured in the nodes, there is a possibility that plural backup paths have consumed the bandwidth for the backup paths allocated to a link, as discussed for JP-A No. 2003-273904. Therefore, when a node autonomously makes a path change, the transport control server must update the shared bandwidth information and notify nodes of a path that becomes unavailable. However, because a number of active paths are switched to backup paths upon a fault occurring, the transport control server must transmit a number of setting change notifications. A problem is an increase in the processing load of the transport control server.

As noted above, when an active path (first active path) is switched to a backup path (first backup path), a backup path (second backup path) for another active path (second active path) may become unavailable. For example, due to the use of the first backup path, it may become impossible to secure the bandwidth of the second backup path sharing a link with the first backup path. This notification is advertised to all nodes in the prior art techniques and, thus, entails a number of advertisements.

When a fault occurring causes switchover from active path to backup path, plural active paths passing through the fault point may be switched to backup paths, causing the changes to plural second backup paths. In that event, multiple advertisements of the changes to the second backup paths must be sent.

In view of the foregoing points, the present invention is intended to prevent a number of advertisements about shared bandwidths or a number of setting change notifications from being generated upon a fault occurring. The present invention is intended to identify nodes in which a backup path setting change is needed and transmit a backup path change notification to these nodes. The present invention is intended to transmit a notification of a backup path setting change on a per-fault basis. The present invention is intended to prevent repeated transmissions of a notification of a backup path setting change due to a fault.

The present invention relates to a network system wherein plural backup paths may share the bandwidth of a link, characterized in that a transport control server calculates a backup path that a node autonomously uses upon receiving a fault notification, erases the settings of a backup path predicted to become unavailable based on path information, topology information, and bandwidth information, selects a backup path alternative to the erased backup path from among candidate paths, and transmits a setting change notification to nodes in which the setting change is needed.

According to a first aspect of the present invention, a transport control server in a network system includes multiple nodes and the transport control server, in which a first backup path is predefined for a first active path between any pair of nodes and having a predetermined first bandwidth secured, a second backup path is predefined for a second active path between any pair of nodes and having a predetermined second bandwidth secured, the first backup path and the second backup path sharing at least one of links, and each node forwards data according to path setting information notified from the transport control server, and the transport control server includes:

a storage section storing, for each path, the identifies of nodes through which the path passes, the first bandwidth of a first active path or first backup path, the second bandwidth of a second active path or second backup path, and auxiliary bandwidths per link allocated for backup paths; and a control processing section, in which the control processing section performs the following comprising:

upon a switchover of a first active path to a first backup path, deciding whether the second bandwidth of a second backup path can be secured by the bandwidth of each of links through which the first backup path passes, referring to the storage section;

if the second bandwidth cannot be secured, identifying nodes through which the second backup path passes, referring to the storage section; and transmitting a setting change notification to delete the second backup path to the identified nodes.

According to a second aspect of the present invention, a transport control system includes:

multiple nodes; and a transport control server, in which a first backup path is predefined for a first active path between any pair of nodes and having a predetermined first bandwidth secured, a second backup path is predefined for a second active path between any pair of nodes and having a predetermined second bandwidth secured, the first backup path and the second backup path sharing at least one of links, and each node forwards data according to path setting information notified from the transport control server, and the transport control server includes:

a storage section storing, for each path, the identifies of nodes through which the path passes, the first bandwidth of a first active path or first backup path, the second bandwidth of a second active path or second backup path, and auxiliary bandwidths per link allocated for backup paths; and a control processing section, in which the control processing section performs the following that includes:

upon a switchover of a first active path to a first backup path, deciding whether the second bandwidth of a second backup path can be secured by the bandwidth of each of links through which the first backup path passes, referring to the storage section;

if the second bandwidth cannot be secured, identifying nodes through which the second backup path passes, referring to the storage section; and transmitting a setting change notification to delete the second backup path to the identified nodes.

According to a third aspect of the present invention, there is provided a backup path setting method for use in a network system including multiple nodes and a transport control server, in which a first backup path is predefined for a first active path between any pair of nodes and having a predetermined first bandwidth secured, a second backup path is predefined for a second active path between any pair of nodes and having a predetermined second bandwidth secured, the first backup path and the second backup path sharing at least one of links, and each node forwards data according to path setting information notified from the transport control server, and the backup path setting method includes:

upon a switchover of a first active path to a first backup path, deciding whether the second bandwidth of a second backup path can be secured by the bandwidth of each of links through which the first backup path passes, referring to a storage section storing, for each path, the identifies of nodes through which the path passes, the first bandwidth of a first active path or first backup path, the second bandwidth of a second active path or second backup path, and auxiliary bandwidths per link allocated for backup paths;

if the second bandwidth cannot be secured, identifying nodes through which the second backup path passes, referring to the storage section; and transmitting a setting change notification to delete the second backup path to the identified nodes.

According to an aspect of the present invention, it is possible to prevent a number of advertisements about shared bandwidths or a number of setting change notifications from being generated upon a fault occurring. According to another aspect of the present invention, it is possible to identify nodes in which a backup path setting change is needed and transmit a backup path change notification to these nodes. According to still another aspect of the present invention, it is possible to transmit a notification of a backup path setting change on a per-fault basis. According to yet another aspect of the present invention, it is also possible to prevent repeated transmissions of a notification of a backup path setting change due to a fault.

BRIEF DESCRIPTION OF THE DRAWINGS

FIG. 8 illustrates a (first) path information table;

FIG. 9 illustrates a (second) path information table;

FIG. 10 illustrates a (third) path information table;

FIG. 11 illustrates a bandwidth information table;

DETAILED DESCRIPTION OF THE PREFERRED EMBODIMENTS

Figure 1:
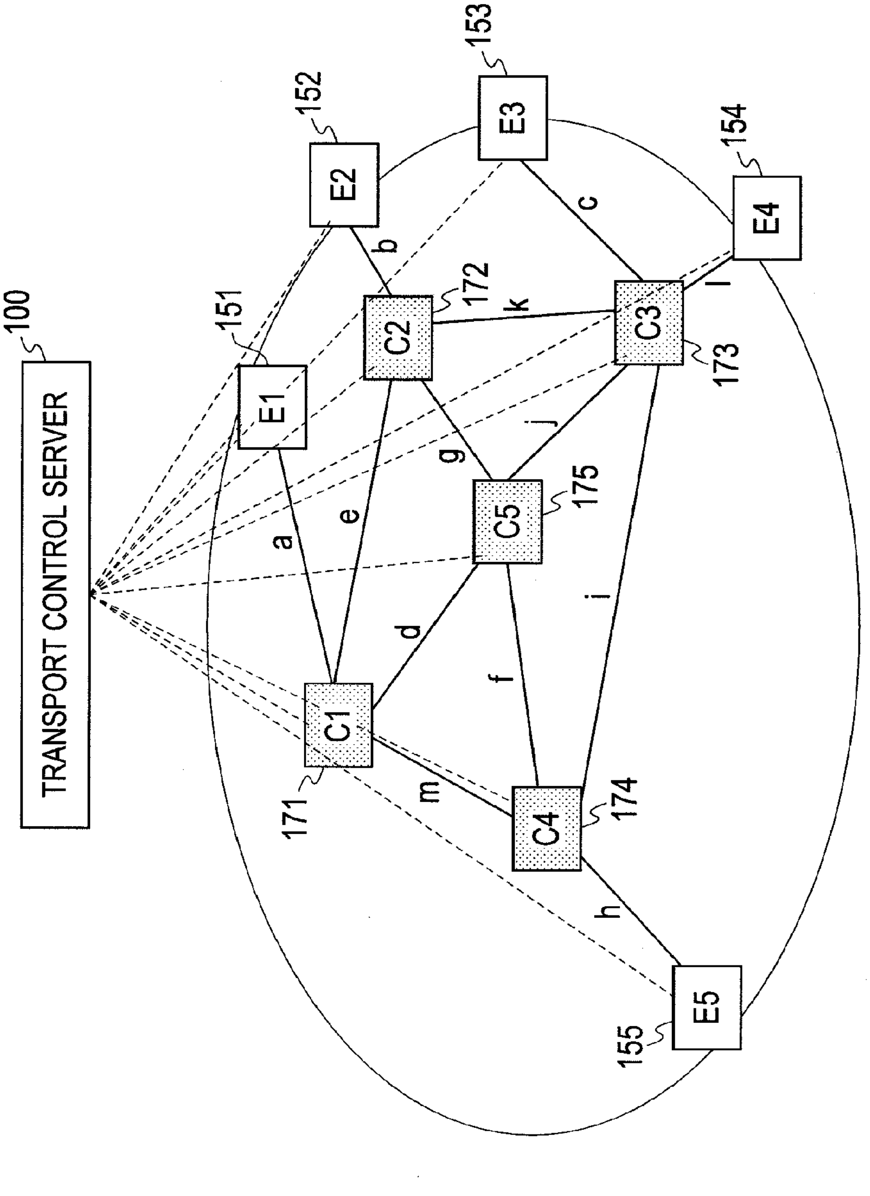
FIG. 1 is an architectural diagram of a transport control system.

In the following, a network system pertaining to an embodiment of the invention will be described in detail with reference to the drawings. In the following, the same reference numerals denote the same items.

FIG. 1 is an architectural diagram of a network system of the present embodiment.

The network system comprises a transport control server 100 that acts as network control entity, edge nodes 151 to 155 that connect a core network managed by the transport control server 100 to another network or terminals, and core nodes 171 to 175 that make up the core network. Links a to h are shown as the links in the network.

The transport control server 100 connects to the edge nodes 151 to 155 and the core nodes 171 to 175 and, for example, sets up a path between edge nodes for connecting these edge nodes. Byway of example, path mechanisms such as MPLS, GMPLS, MPLS-TP, and PBB-TE can be used. In the network managed by the transport control server, endpoints of a path are considered as edge nodes.

Figure 2:
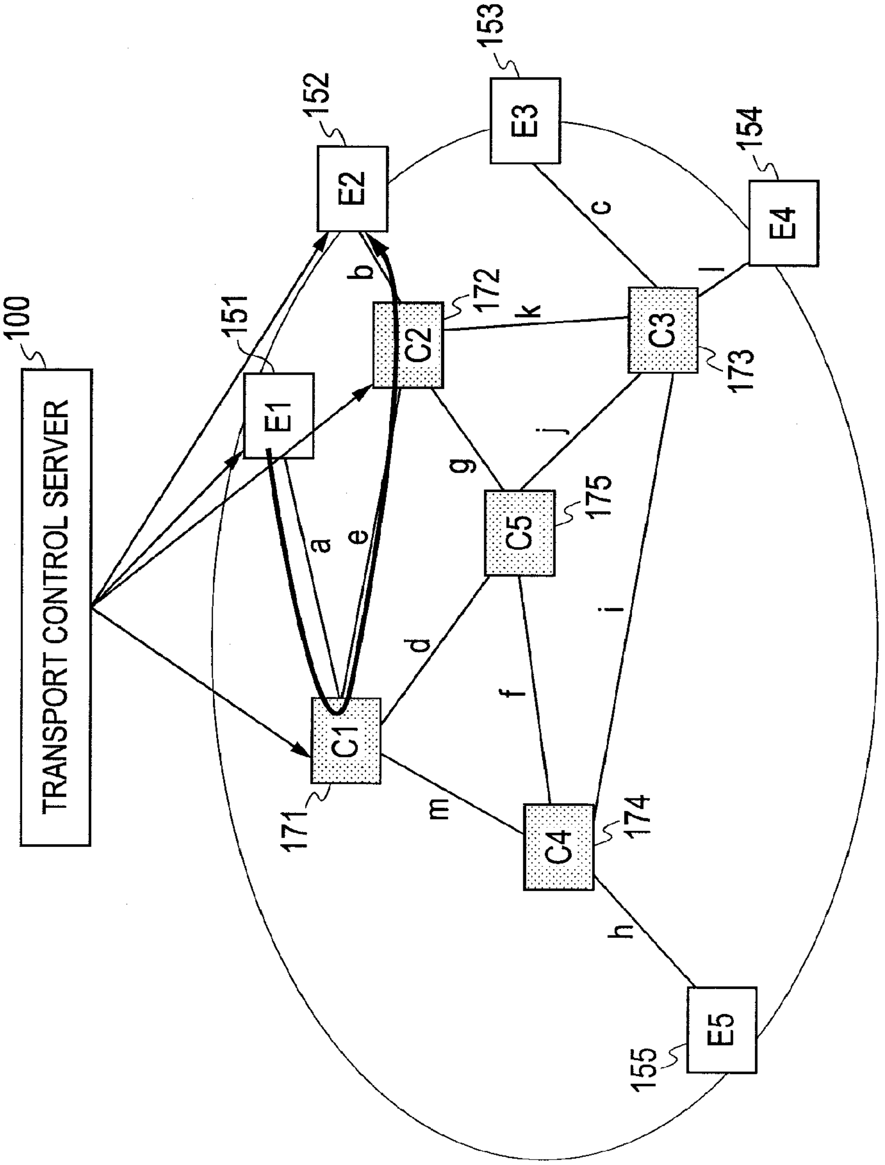
FIG. 2 is an explanatory diagram of the transport control system, when setting up a path.

FIG. 2 illustrates a relationship among the transport control server 100, edge nodes 151 to 155, and core nodes 171 to 175, when setting up a path.

The transport control server 100 manages topology information such as links and path information such as path routes, allocated bandwidths, shared bandwidths, labels, and tags for the edge nodes 151 to 155 and the core nodes 171 to 175.

When setting up a path whose endpoints are edge nodes 151 and 152 and passing through core nodes 171 and 172, the transport control server 100 calculates settings to be provided to the edge nodes 151, 152 and the core notes 171, 172 and transmits a setting change notification. The edge nodes 151, 152 and the core notes 171, 172 forward data according to the settings provided by the transport control server 100.

Figure 3:
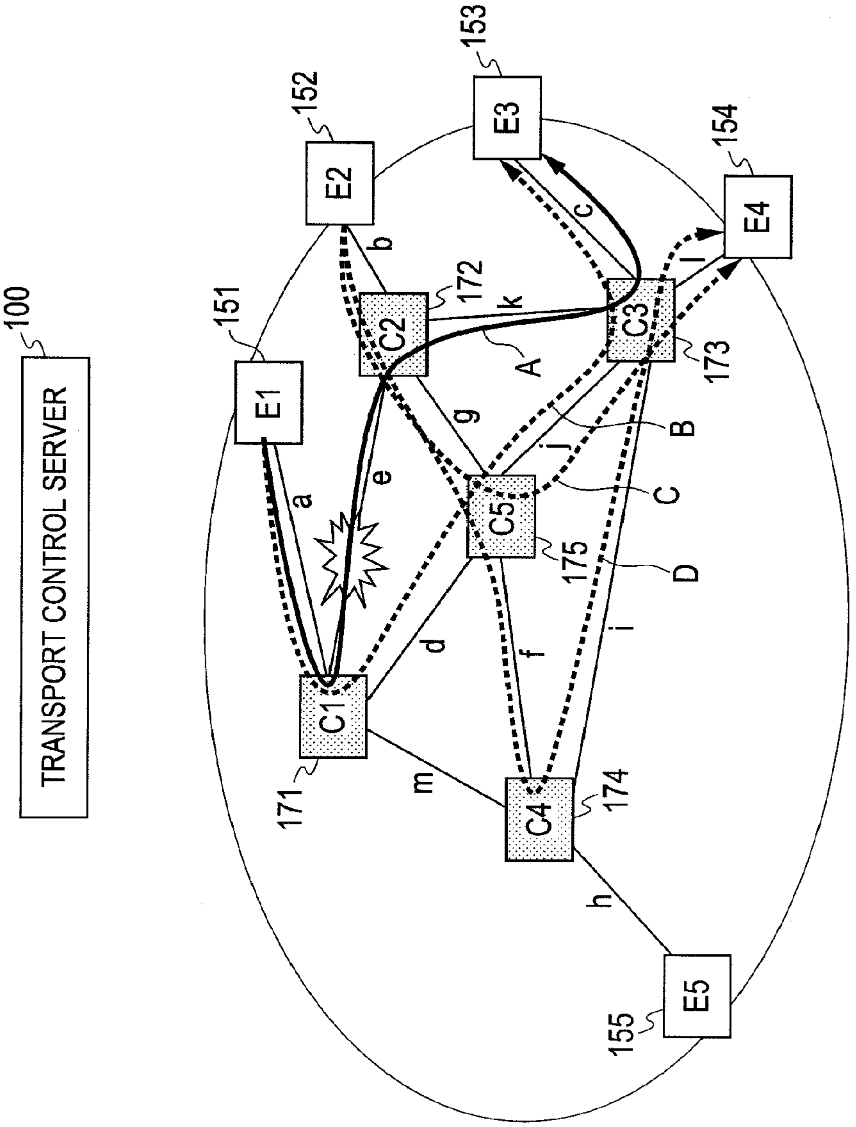
FIG. 3 is an explanatory diagram of the transport control system upon a fault occurring.

FIG. 3 illustrates a relationship among the transport control server 100, edge nodes 151 to 155, and core nodes 171 to 175, upon a fault occurring.

As an active path, an active path A is set up between endpoints of edge nodes 151, 153, passing through core nodes 171, 172, 173. As a backup path for the active path A, a backup path B is set up between the endpoints of edge nodes 151, 153, passing through core nodes 171, 175, 173. Further, as a backup path for an active path F (not shown) different from the active path A, a backup path C is set up between endpoints of edge nodes 152, 154, passing through core nodes 172, 175, 173. The backup path B and the backup path C share a bandwidth across a link j between the core nodes 175 and 173. The transport control server 100 manages the active path A, the backup paths B, C, and, moreover, a candidate path D which is used as an alternative to the backup path C. The candidate path D is routed between endpoints of edge nodes 152, 154, passing through core nodes 172, 175, 174, 173.

When a core node 171 detects a fault in a link e, it sends a fault notification to the transport control server 100 and the edge node 151, one endpoint of the active path A that passes through the core node 171 and the link e. Information in the fault notification includes a link ID, the identifier of the link in which the fault occurred. The edge node 151 autonomously switches the active path A passing through the fault point to the backup path B. Upon receiving the fault notification, the transport control server 100 predicts the active path A that is switched to the backup one due to the fault, identifies core nodes and links through which the active path A and the backup path B for the active path A pass, and calculates a change in the bandwidth across each of the links a, d, j, c thorough which the backup path B passes. With regard to the backup paths passing through the links d, j whose bandwidth changes, the transport control server 100 decides whether the backup path C that shares a link bandwidth has a sufficient bandwidth. If deciding that the bandwidth of the backup path C is insufficient, the transport control server 100 transmits a setting change notification to erase the backup path C with an insufficient bandwidth from the settings maintained on the edge nodes 152, 153 and the core nodes 172, 175, 173. If there is an available candidate path D instead of the backup path C, the transport control server 100 transmits a setting change notification to set up a new backup path D, when transmitting the setting change notification to erase the backup path C. In FIG. 3, the transport control server 100 manages the candidate path D alternative to the backup path C and, therefore, transmits the setting change notification to set up the backup path D to the edge nodes 152, 154 and the core nodes 172, 175, 174, 173. The edge nodes 152, 153, 154 and the core nodes 172, 175, 173, 174 make a change to the settings according to the notification from the transport control server 100.

Figure 4:
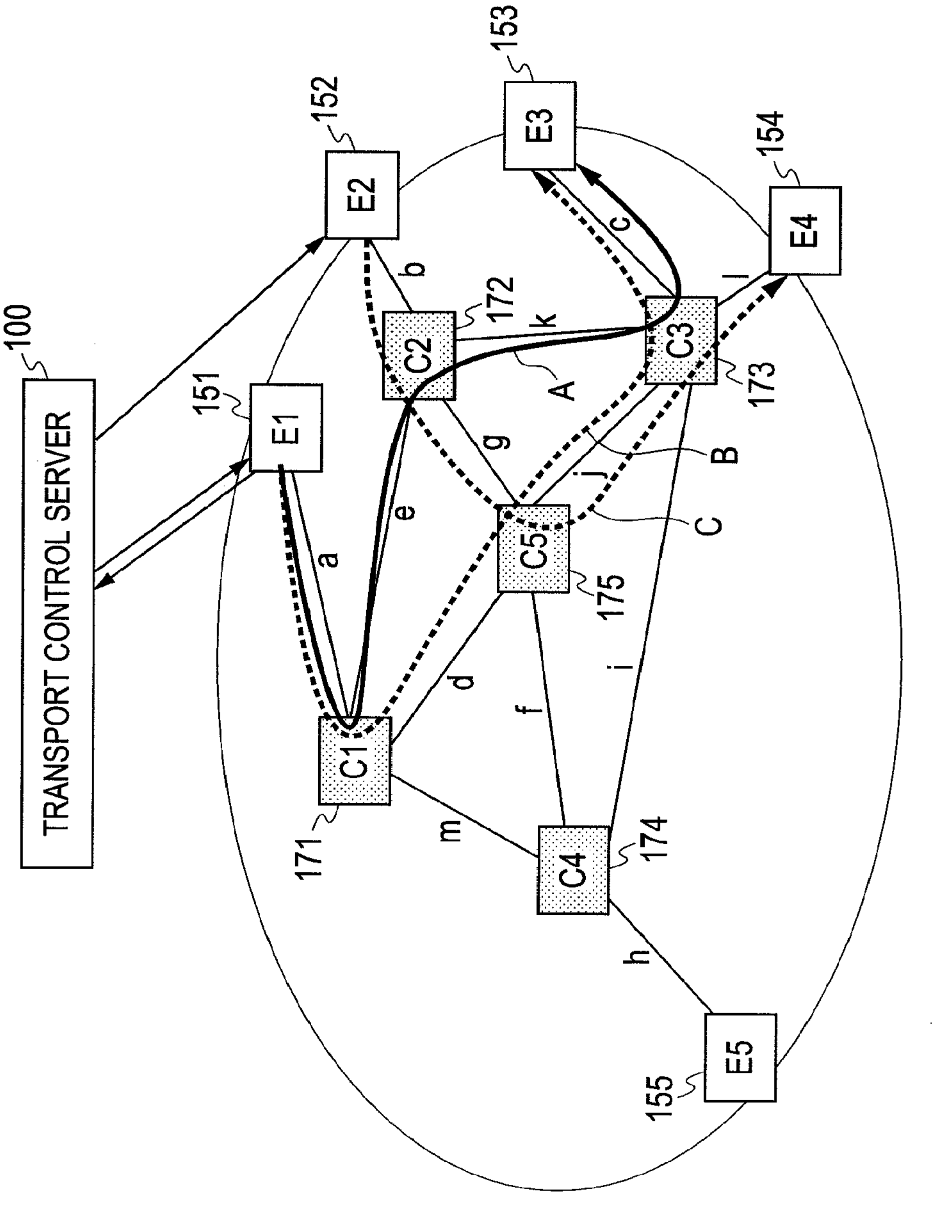
FIG. 4 is an explanatory diagram of the transport control system upon a path change.

FIG. 4 illustrates a relationship among the transport control server 100, edge nodes 151 to 155, and core nodes 171 to 175, when an edge node 151 autonomously changes an active path A to a backup path B.

While FIG. 3 illustrates a case where a fault has occurred in a link, the present embodiment can also be applied to a case where a path change occurs irrespective of whether or not a fault occurs. An active path A between the endpoints of edge nodes 151, 153 passes through core nodes 171, 172, 173. A backup path B for the active path A between the endpoints of edge nodes 151, 153 passes through core nodes 171, 175, 173. As a backup path for an active path F different from the active path A, a backup path C is set up between the endpoints of edge nodes 152, 154, passing through core nodes 172, 175, 173. The backup path B and the backup path C share a bandwidth across a link j between the core nodes 175 and 173.

Description is provided for the case where the edge node 151 has changed the active path A to the backup path B. When the edge node 151 autonomously switches the active path A to the backup path B, it transmits a path change notification to the path transport control server 100. Upon receiving the path change notification, the transport control server 100 identifies core nodes, edge nodes, and links through which the active path A and the backup path B pass and calculates a change in the bandwidth across each of the links a, d, j, c thorough which the backup path B passes. With regard to the backup paths passing through the links d, j whose bandwidth changes, the transport control server 100 decides whether the backup path C that shares a link bandwidth has a sufficient bandwidth. If deciding that the bandwidth of the backup path C is insufficient, the transport control server 100 transmits a setting change notification to erase the backup path C with an insufficient bandwidth from the settings maintained on the edge nodes 152, 154 and the core nodes 172, 175, 173. If there is an available candidate path instead of the backup path C, the transport control server 100 also transmits a setting change notification to set up a new backup path, when transmitting the setting change notification to erase the backup path C. The edge nodes 152, 153, 154 and the core nodes 172, 175, 173 make a change to the settings according to the notification from the transport control server 100.

Figure 5:
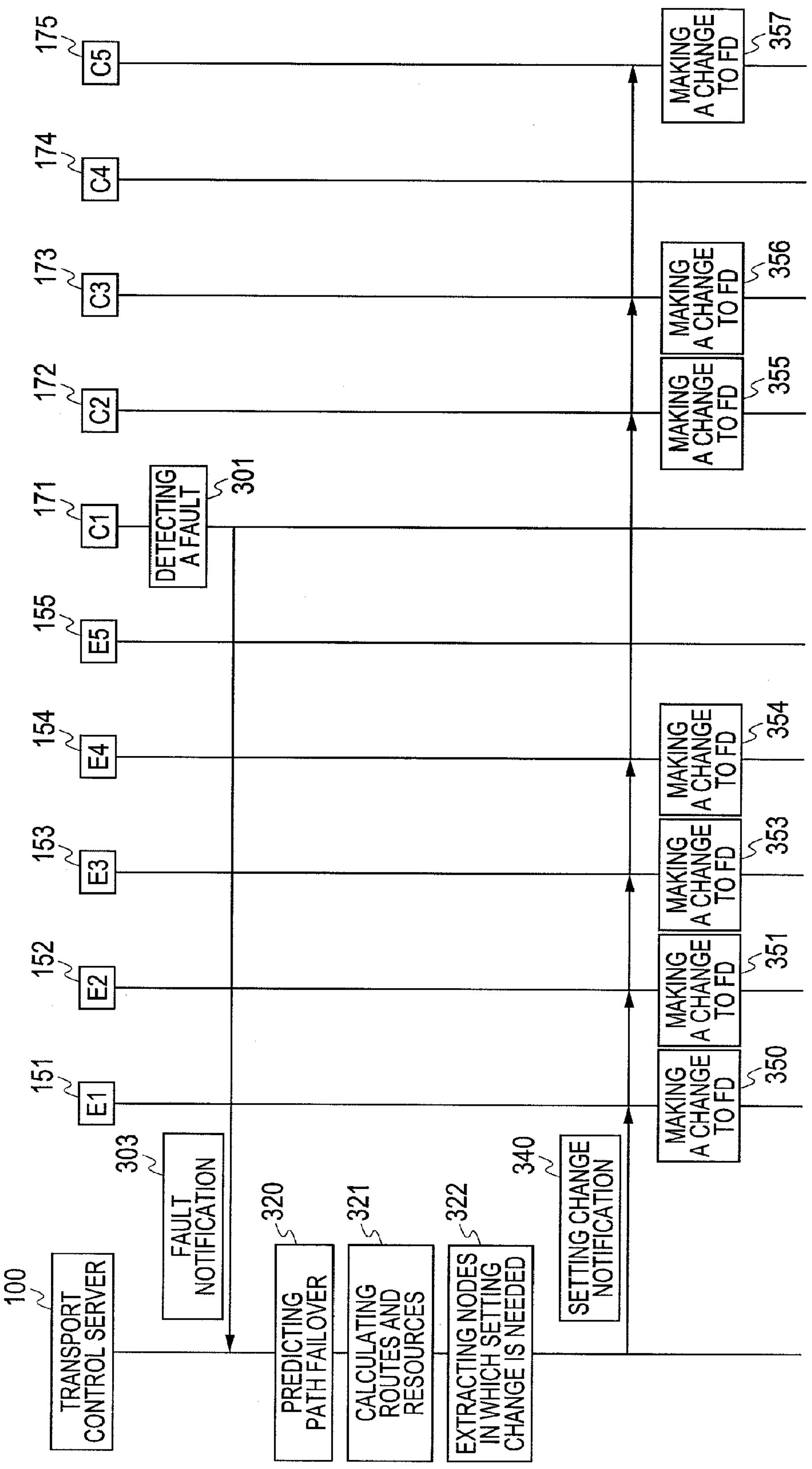
FIG. 5 illustrates a signaling sequence in the transport control system upon a fault occurring.

FIG. 5 illustrates an example of signaling sequence between the transport control server 100 and the edge nodes 151 to 155 as well as the core nodes 171 to 175 upon a fault occurring.

At step 301, a core node 151 detects a fault. This fault detection detects a link fault or a node fault such as, e.g., Sonet Alarm, but not detecting a fault on a per-path basis. At step 303 a fault notification is transmitted from the core node 151 to the transport control server 100. The fault notification includes, inter alia, information indicating a fault point (e.g., the ID of a faulty link). At step 320, the transport control server 100 identifies the active path passing through the fault point and finds a backup path to be used and links through which the backup path passes. At step 321, the transport control server 100 recalculates the bandwidths of the links through which the backup path passes. At step 322, the transport control server 100 finds a backup path with an insufficient bandwidth out of backup paths passing through links whose bandwidth was altered and extracts edge nodes and core nodes through which the backup path passes. If the transport control server 100 manages a candidate path alternative to the backup path with an insufficient bandwidth, it extracts edge nodes and core nodes in which setting is needed to use the candidate path as a backup path. At step 340, the transport control server 100 transmits a setting change notification to the core nodes 151 to 154 and edge nodes 172, 173, 175 in which setting change is needed. At steps 350 to 357, the core nodes 151 to 154 and edge nodes 172, 173, 175 make a change to a forwarding database maintained therein according to the setting change notification in step 340.

Figure 6:
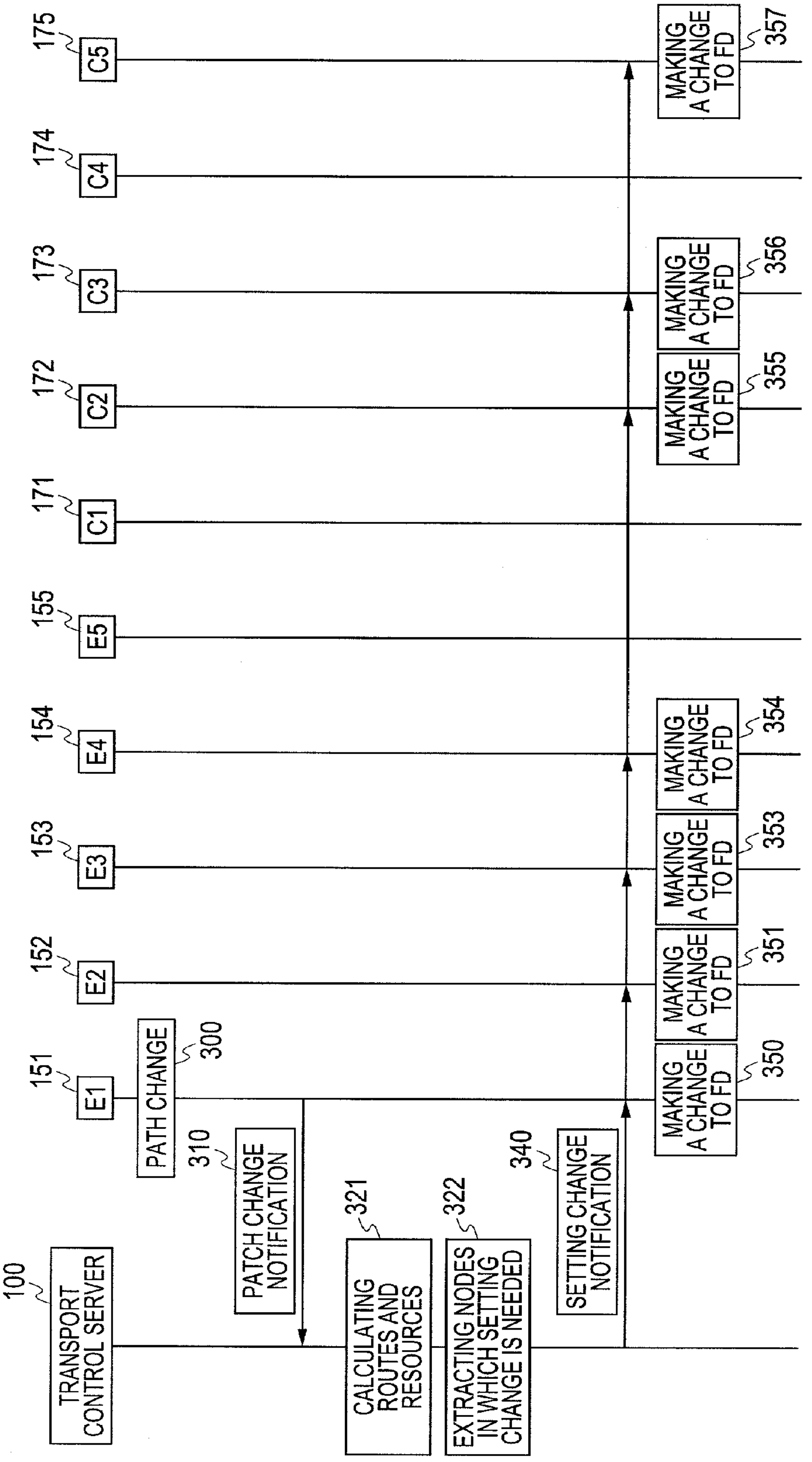
FIG. 6 illustrates a signaling sequence in the transport control system upon a path change.

FIG. 6 illustrates an example of signaling sequence between the transport control server 100 and the edge nodes 151 to 155 as well as the core nodes 171 to 175 upon a path change occurring.

At step 300, an edge node 151 changes the active path to the backup path. Such path change is triggered by fault detection on a per-path basis, such as, e.g., CV (Connection Verification) and FFD (Fast Fault Detection). At step 310, a path change notification is transmitted from the edge node 151 to the transport control server 100. The path change notification may include anyone or more of the following items of information: the labels or tags of the active path failed and the backup path switched over to, the ID of the node that switched the active path to the backup path, and information about the fault detection that triggered the switching. At step 321, the transport control server recalculates the bandwidths of links through which the backup path passes. At step 322, it finds a backup path with an insufficient bandwidth out of backup paths passing through links whose bandwidth was altered and extracts edge nodes and core nodes through which the backup path passes. If the transport control server 100 manages a candidate path alternative to the backup path with an insufficient bandwidth, it extracts edge nodes and core nodes in which setting is needed to use the candidate path as a backup path. At step 340, the transport control server 100 transmits a setting change notification to the edge nodes 151 to 154 and core nodes 172, 173, 175 in which setting change is needed. At steps 350 to 357, the edge nodes 151 to 154 and core nodes 172, 173, 175 make a change to the forwarding database maintained therein according to the setting change notification in step 340.

Figure 7:
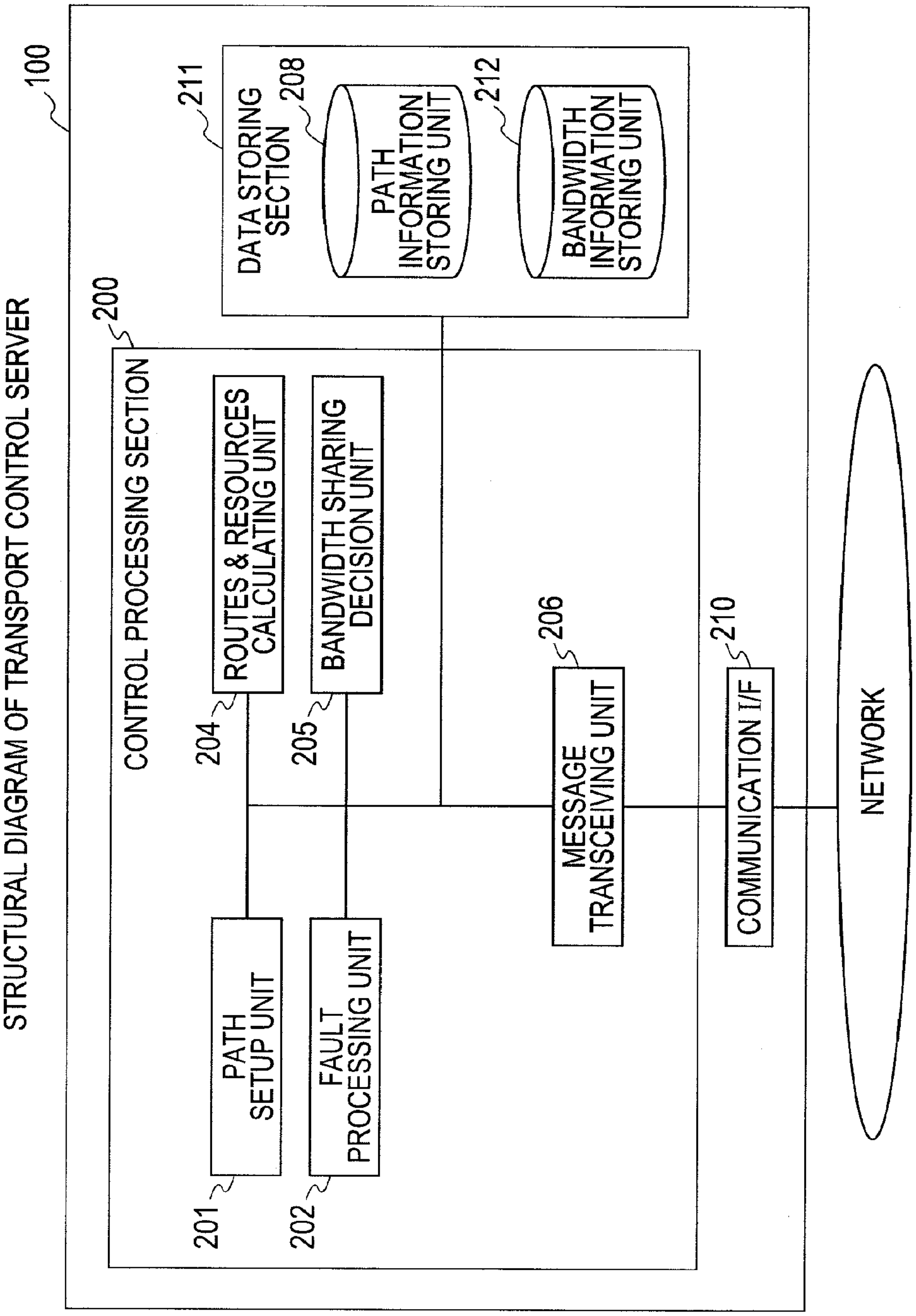
FIG. 7 is a structural diagram of a transport control server.

FIG. 7 shows a structural diagram of the transport control server 100.

The transport control server 100 comprises a control processing section 200, a data storing section 211, and a communication IF 210. The control processing section 200 comprises a path setup unit 201, a fault processing unit 202, a routes and resources calculating unit 204, a bandwidth sharing decision unit 205, and a message transceiving unit 206. The data storing section 211 comprises a path information storing unit 208 and a bandwidth information storing unit 212. The path information storing unit 208 includes first, second, and third tables which will be described later. Topology information may further be stored in the data storing section 211. The transport control server 100 may further comprise an input section.

The path setup unit 201 sets a path connecting edge nodes 151 to 154 and core nodes 171 to 175. The fault processing unit 202, when receiving a network fault notification, decides whether the fault notification has already been handled or it is about a new fault and identifies an active path failed and a backup path switched over to. The routes and resources calculating unit 204 finds the routes of active paths and backup paths and calculates bandwidths that are secured for each of the active paths and backup paths. The bandwidth sharing decision unit 205 finds a backup path that becomes unavailable, based on the results of the calculation of the routes and resources calculating unit 204.

FIG. 8 illustrates a part (first table) of the path information storing unit 208.

The first table 700 contains information in the following columns: active ID 401, endpoint node 402, backup path 403, candidate path ID 401, and bandwidth of path 419. For active path IDs 401, appropriate identification information such as, e.g., sequential numbers, alphabetic letters, etc. to identify active paths may be used. Endpoint nodes 402 in a pair indicate the endpoints of a path, the source and destination of communication via the path, and the IDs of these nodes are stored. The backup path 403 column comprises a backup path ID 418 column for backup path identifiers and a bandwidth sharing 420 column to indicate whether or not bandwidth sharing is applied. Candidate path IDs 404 are the identifiers of third optional paths managed by the transport control server 100, aside from active paths and backup paths which are set on the nodes. For candidate path IDs, identification information, for example, like active path IDs 401 may be used. The bandwidth of path 419 column contains information for a bandwidth secured for the active path designated in the active path ID 401 column.

FIG. 9 illustrates a part (second table) of the path information storing unit 208.

The second table 705 contains information in the following columns: path ID 405, transit node 406, and transit link 407. The path ID 405 column contains the identifiers of paths such as active path IDs 401, backup path IDs 418, and candidate path IDs designated in the first table 700. In the transit node 406 column, the identifiers of nodes through which the path passes may be specified. In the transit link 407 column, the identifiers of links through which the path passes may be specified.

FIG. 10 illustrates a part (third table) of the path information storing unit 208.

The third table 715 contains information in the following columns: path ID 405, transit node 406, input label and interface 435, and output label and interface 440. The path ID 405 column contains the identifiers of active paths, backup paths, and candidate paths. The transit node 406 column contains the identifiers of nodes through which the path passes. The input label and interface 435 information comprises a path input interface and its label of each transit node along the path identified by the path ID 405, wherein this label has to be included in the header of a packet. The output label and interface 440 information comprises a path output interface and its label of each transit node along the path identified by the path ID 405, wherein this label has to be specified in the header of a packet.

FIG. 11 illustrates a part (fourth table) of the bandwidth information storing unit 212.

The bandwidth information storing unit 212 stores information, e.g., in the following columns: link ID 408, operating status 409, link bandwidth 410, unreserved bandwidth 411, actually used bandwidth 412, auxiliary bandwidth 413, and path ID of path passing through link 417. In link ID 408 column, the identifiers of links may be specified. The operating status 409 column can indicate whether the link is in normal operation or abnormal condition. A flag value in the operating status 409 column is turned to an abnormal indication when the transport control server 100 receives a fault notification and turned to a normal indication when this flag is reset by the user. The link bandwidth 410 column indicates a maximum link bandwidth at which data is transported across the link. The unreserved bandwidth 411 column can indicate a bandwidth not secured for an active path and a backup path. The actually used bandwidth 412 column can indicate a total of the bandwidths of all active paths passing through the link. The actually used bandwidth 412 column comprises an occupied bandwidth 414 column and a shared bandwidth 414 column. The occupied bandwidth 414 column can indicate a total of the bandwidth of backup paths that do not share a bandwidth with any other backup path. The shared bandwidth 414 column can indicate a total of the band widths of backup paths in each of several groups SRG1, SRG2, SRG3, etc. in areas where faults are liable to occur simultaneously. The path ID of path passing through link 417 column comprises an active path ID column 401, a backup path ID 418 column, and a candidate path ID 417 column for active, backup, and candidate paths passing through the link. In the backup path ID 418 column, backup path IDs sorted by occupied bandwidth and SRG as in the auxiliary bandwidth column can be stored.

Figure 12:
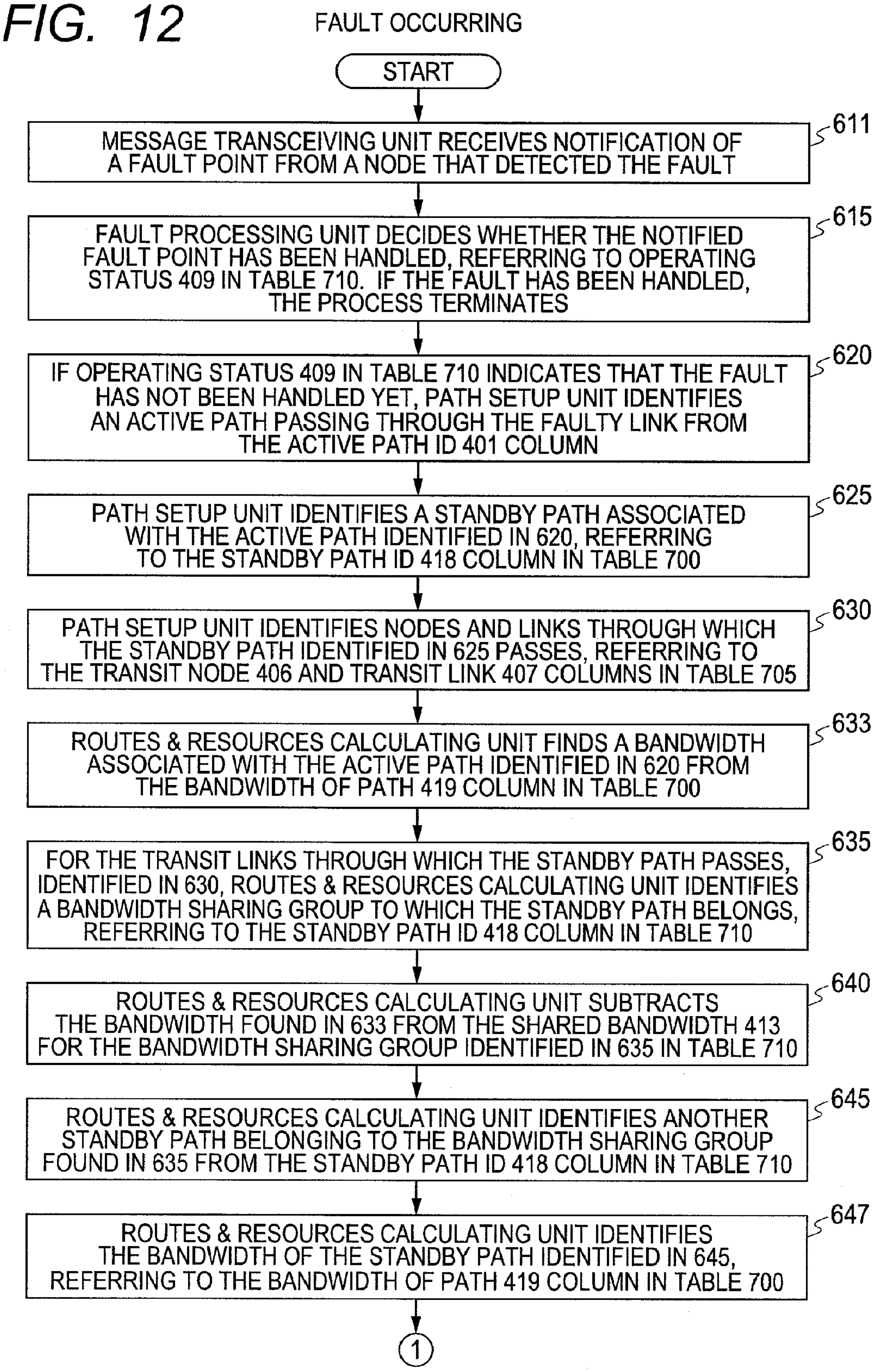
FIG. 12 is a flowchart (1) of a process when the transport control server receives a fault notification.
Figure 13:
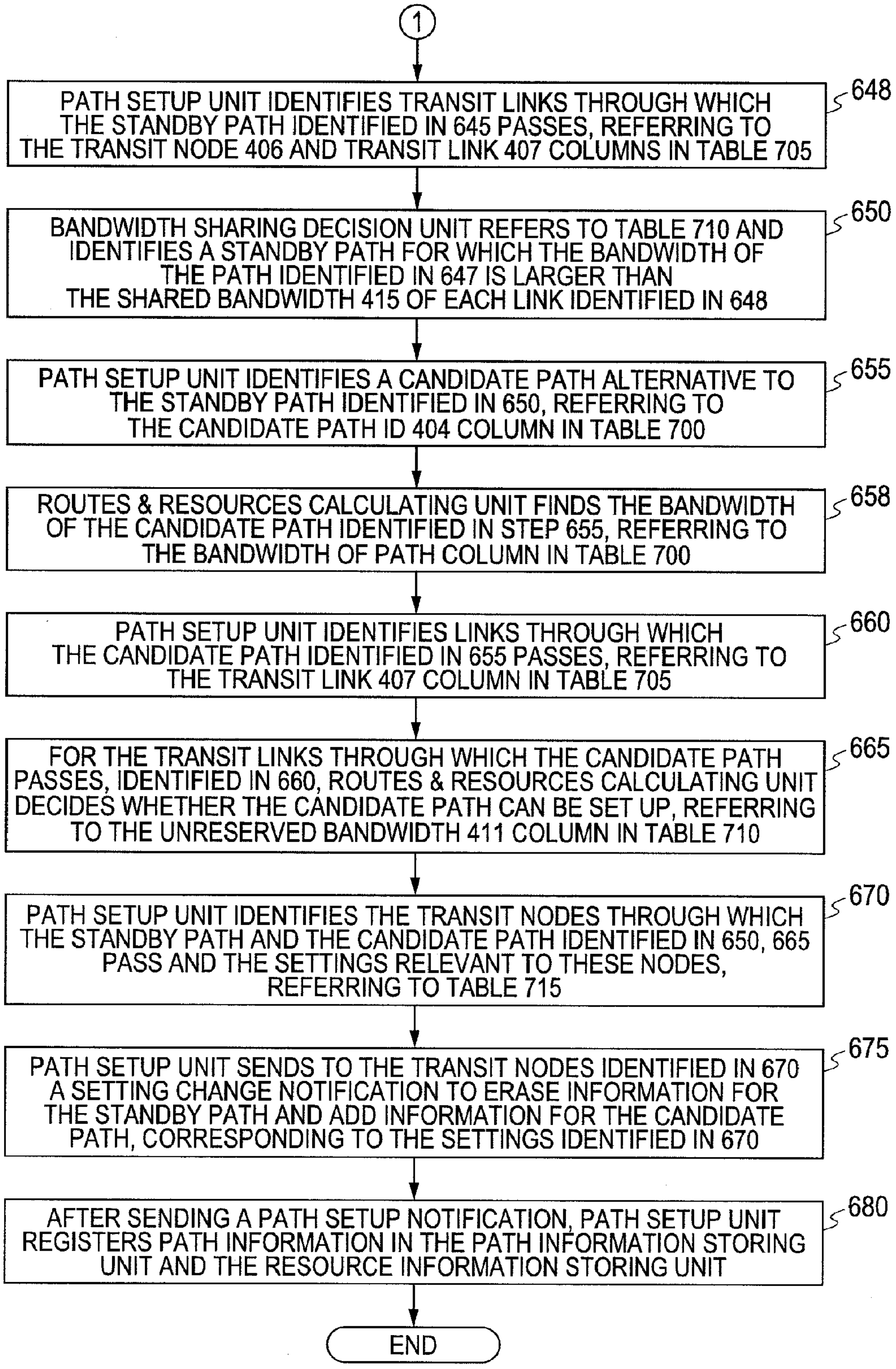
FIG. 13 is a flowchart (2) of the process when the transport control server receives a fault notification.

FIG. 12 and FIG. 13 illustrate a flowchart of a process when the transport control server 100 receives a fault notification.

At step 611, the message transceiving unit 206 receives fault notification information from a node that detected a fault. The fault notification information includes the ID of a link in which a fault occurred. At step 615, the fault processing unit 202 refers to the operating status 409 associated with the link ID 408 included in the fault notification information in the fourth table 710. The operating status may have two flag values corresponding to normal and abnormal indications. If the operating status 409 is an abnormal indication, the fault processing unit 202 decides that the fault has already been handed and terminates the process. If the operating status 409 is a normal indication ("O" as in FIG. 11), the fault processing unit 202 turns the value of the operating status 409 associated with the link ID 408 included in the fault notification information to an abnormal indication and the process goes to step 620. The values corresponding to the normal and abnormal indications can be predetermined.

At step 620, the path setup unit 201 identifies an active path passing through the link, referring to the fourth table 710 and the active path ID 401 column in the row (entry) of the link ID 408 matching the link ID included in the fault notification information. If multiple active paths pass through the link, the following steps 625 to 670 are repeated times as many as the number of the active paths. If the corresponding cell of active path ID 410 is empty, the process terminates.

At step 625, the path setup unit 201 identifies a backup path, referring to the first table 700 and the backup path ID 418 column in the row of the active path ID 401 matching the ID of the active path identified in step 620. The thus identified backup path is the path switched from the active path autonomously by one of the nodes 151 to 155 upon the occurrence of the notified fault and traffic now flows on this path. If the corresponding cell of backup path ID 418 is empty, the process terminates. At step 630, the path setup unit 201 identifies nodes and links through which the backup path passes, referring to the second table 705 and the transit node 406 and transit link 407 columns in the row of the path ID 405 matching the ID of the backup path identified in step 625. If the backup path passes through multiple links, the following steps 635 to 670 are repeated times as many as the number of the links.

At step 633, the routes and resources calculating unit 204 finds a bandwidth of the active path identified in step 620, referring to the first table 700 and the bandwidth of path 419 column in the row of the active path ID 401 matching the ID of the active path identified in step 620. Upon switching from the active path to the backup path, the same bandwidth as the active path is secured for the backup path. In the first table 700, hence, the bandwidth of the backup path is regarded as equivalent to the bandwidth of the active path.

At step 635, the routes and resources calculating unit 204 identifies a bandwidth sharing group including the ID of the backup path identified in step 625, referring to the fourth table 710 and the backup path ID 418 column in the row of the link ID 408 matching the ID of a transit link through which the backup path passes identified in step 630. At step 640, the routes and resources calculating unit 204 subtracts the bandwidth of the path found in step 633 from the shared bandwidth 415 in the column of the bandwidth sharing group identified in step 635 in the row of the link ID 408 matching the ID of a link identified in step 630 in the fourth table 710. The bandwidth in the column is updated to the result of the subtraction. The thus updated bandwidth will be referred to as a regulated shared bandwidth hereinafter.

At step 645, the routes and resources calculating unit identifies a backup path ID different than the backup path ID identified in step 625, which belongs to the same bandwidth sharing group as identified in step 635 in the backup path ID 418 column, in the row of the link ID 408 matching the ID of a transit link through which the backup path (first backup path) passes identified in step 630 in the fourth table 710. The backup path identified in this step will be referred to as an associated backup path (second backup path) hereinafter. If there are multiple associated backup paths, steps 647 to 670 are repeated times as many as the number of the associated backup paths. If there is no associated backup path, the process goes to step 672.

At step 647, the routes and resources calculating unit 204 finds a bandwidth (second bandwidth) necessary for the associated backup path, referring to the first table 700 and the bandwidth of path 419 column in the row of the backup path ID 418 matching the ID of the associated backup path identified in step 645.

Proceeding to FIG. 13, at step 648, the path setup unit 201 identifies nodes and links through which the associated backup path passes, referring to the second table 705 and the transit node 406 and transit link 407 columns in the row of the path ID 405 matching the ID of the associated backup path identified in step 645. If the backup path passes through multiple links, step 650 is repeated times as many as the number of the links.

At step 650, the bandwidth sharing decision unit 205 locates in the fourth table 710 the row of the link ID 408 matching the ID of a transit link identified in step 648 and identifies a backup path for which the bandwidth of the path found in step 647 is larger than the bandwidth (the regulated shared bandwidth updated in step 640) of the bandwidth sharing group identified in step 635. The backup path identified in this step will be referred to as an affected backup path hereinafter. If multiple affected backup paths are identified in this step, steps 655 to 670 are repeated times as many as the number of the affected backup paths.

At step 655, the path setup unit 201 identifies a new candidate path alternative to the affected backup path, referring to the first table 700 and the candidate path ID 404 column in the row of the backup path ID 418 matching the ID of the affected backup path identified in step 650. At step 658, the routes and resources calculating unit 204 finds a bandwidth necessary for setting up the candidate path, referring to the first table 700 and the bandwidth of path 419 column in the row of the candidate path ID 404 matching the ID of the candidate path identified in step 655. At step 660, the path setup unit 201 identifies links through which the candidate path passes, referring to the second table 705 and the transit link 407 column in the row of the path ID 405 matching the ID of the candidate path identified in step 655. At step 665, for each of the links identified in step 660, the routes and resources calculating unit 204 decides whether the bandwidth found in step 658 is smaller than the unreserved bandwidth 411 in the row of the link ID 408 matching the ID of a transit link identified in step 660. If the bandwidth found in step 658 is smaller than the unreserved bandwidth with regard to all transit links, the routes and resources calculating unit 204 decides to set up the candidate path identified in step 655 as a new backup path alternative to the affected backup path identified in step 655. If there is no candidate path satisfying the condition, it is decided that a new backup path does not exist. The new backup path identified in this step will be referred to as a new backup path hereinafter.

At step 670, the path setup unit 201 identifies nodes required to delete the affected backup path and set up the new backup path and settings relevant to the nodes, referring to the third table 715 and the transit nodes associated with the path ID 405 matching the ID of the affected backup path identified in step 650 and the path ID 405 matching the ID of the new backup path decided in step 665 and the values of input label and interface 435 and output label and interface 440 in the rows of the transit nodes. If a new backup path does not exist, as decided in step 665, the above step only applies to the affected backup path. The values as the label of the affected backup path are to be erased from the forwarding table in the transit nodes associated with the path. The values as the input label and interface and the output label and interface of the new backup path are to be added to the table in the transit nodes associated with the path.

At step 675, the message transceiving unit 206 sends to the transit nodes associated with the affected backup path, identified in step 670, a setting change notification to delete the values of the input label and interface and the output label and interface of the affected backup path. It also sends to the transit nodes associated with the new backup path, identified in step 670, a setting change notification to add the values of the input label and interface and the output label and interface of the new backup path. If a new backup path does not exist, as decided in step 665, the above step only applies to the affected backup path.

At step 680, the path setup unit 201 deletes the ID of the affected backup path identified in step 650 from the backup path ID 418 column of the first table 700. If a new backup path exists, as decided in step 665, it also deletes the ID of the new backup path from the candidate path ID 404 column of the first table 700 in the row in which the affected backup path ID was deleted, adds the new backup path ID to the backup path ID 418 column in the same row, and changes the bandwidth sharing 420 column in the same row to a value indicating the state of the path that does not share a bandwidth. Further, the path setup unit 201 accesses the entries in the link ID 408 column of the fourth table 710, matching the transit links identified in step 660, and subtracts the bandwidth of path found in step 658 from the unreserved bandwidth 411 in the corresponding rows. The foregoing steps may be executed by appropriate blocks in the control processing section 200.

Figure 18:
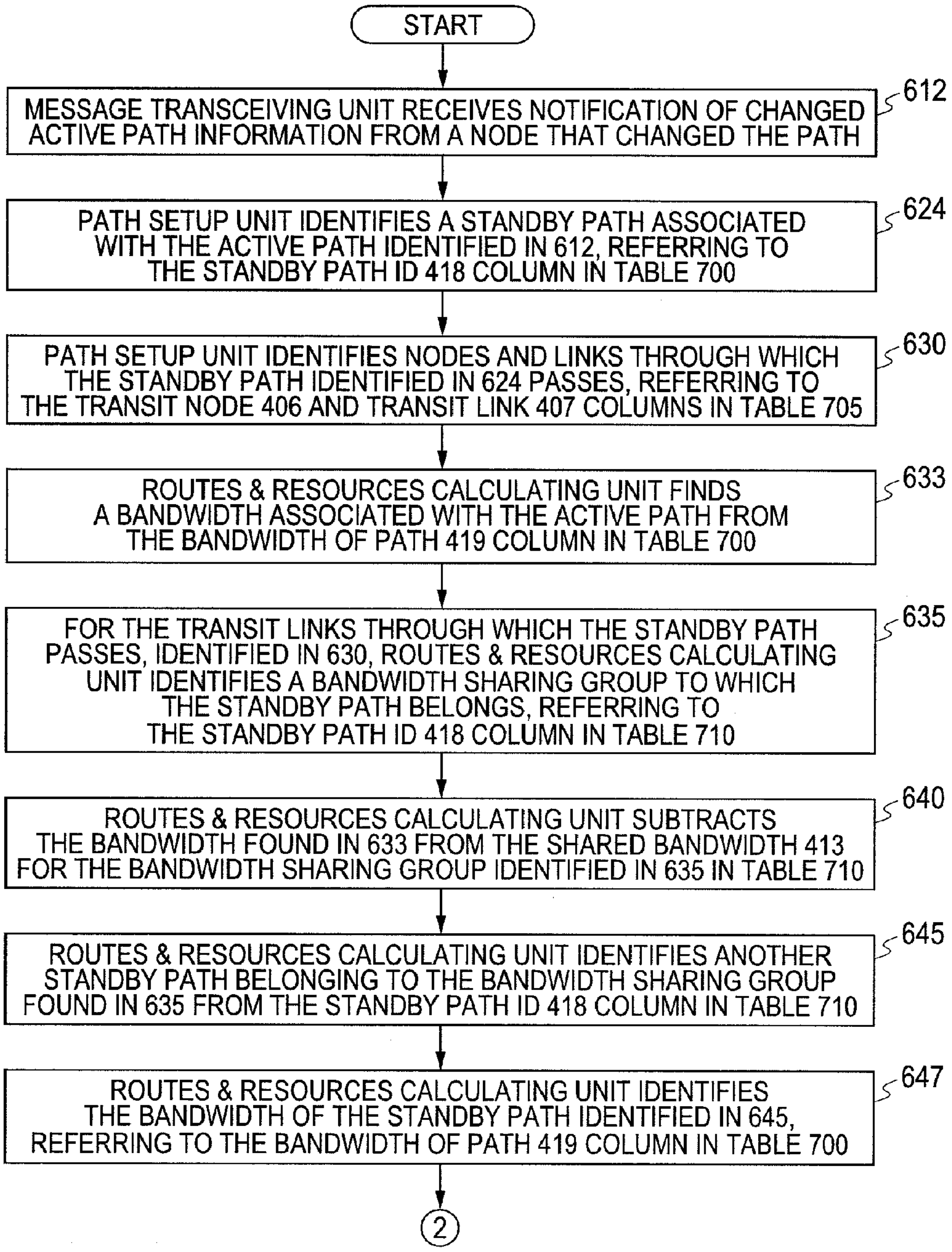
FIG. 18 is a flowchart (1) of a process when the transport control server receives a path change notification.
Figure 19:
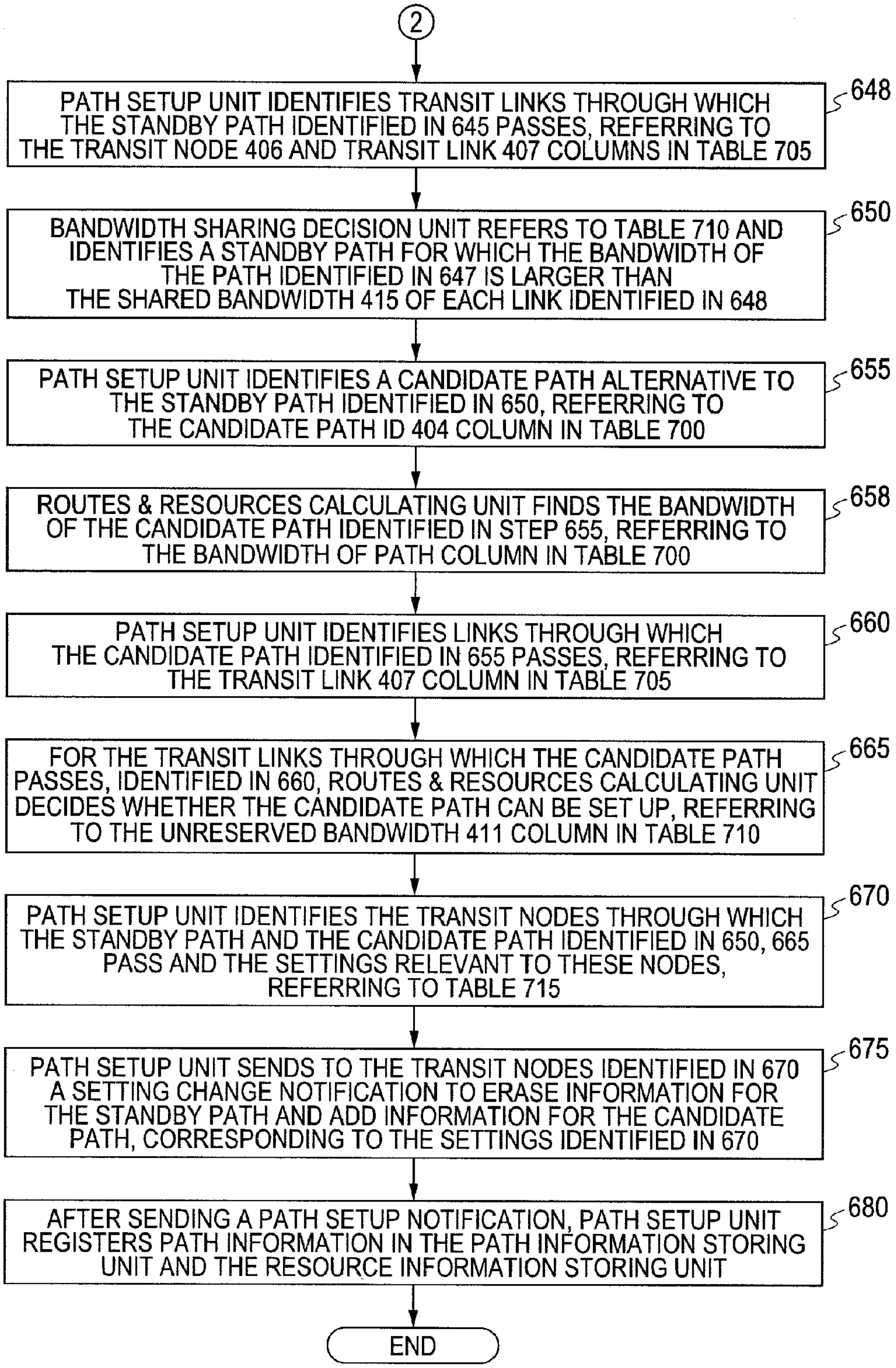
FIG. 19 is a flowchart (2) of the process when the transport control server receives a path change notification.

FIG. 18 and FIG. 19 illustrate a flowchart of a process when the transport control server 100 receives a path change notification.

At step 612, the message transceiving unit 206 receives a path change notification from a node that changed a path. The path change notification information includes the ID of an active path that the node changed. At step 624, the path setup unit 201 identifies a backup path, referring to the first table 700 and the backup path ID 418 column in the row of the active path ID 401 matching the ID of the active path identified in step 612. If the corresponding cell of backup path ID 418 is empty, the process terminates. The path change notification may include the ID of a backup patch switched over to from the active path. In this case, both active path and backup path can be identified from the information included in the path change notification.

Step 630 and subsequent steps are the same as those of the foregoing process upon a fault occurring illustrated in FIG. 12 and FIG. 13.

Figure 14:
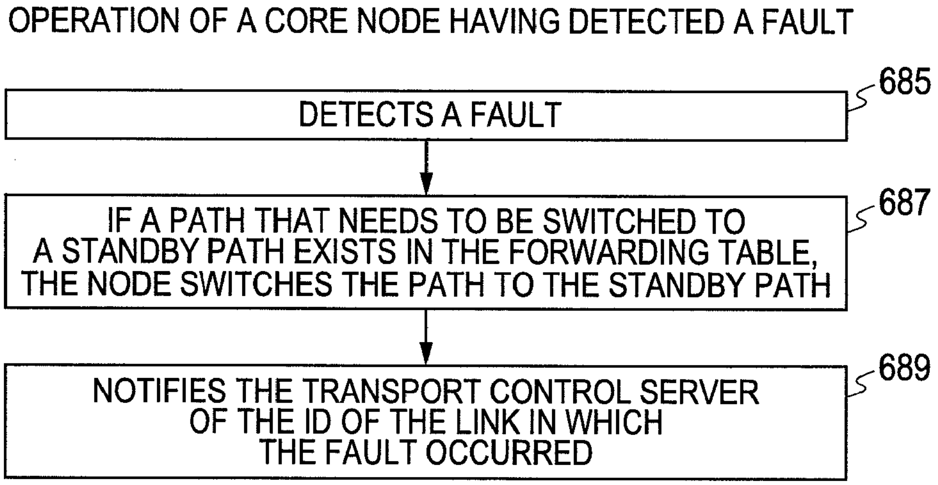
FIG. 14 is a flowchart of a process when a core node has detected a fault.

FIG. 14 illustrates a flowchart of a process when a core node has detected a fault. By way of example, a case is described where a core node 171 detects a fault in a link e. The same applies to other cases when any other core node detects a fault in a link.

At step 685, the core node 171 detects a fault in the link e connected to the core node. At step 687, the core node 171 refers to the forwarding table maintained therein and decides whether there is a path that forwards traffic onto the faulty link detected and a backup path alternative to the path was set up. If there is such an active path for which a backup path was set up, the node switches the output interface and label from the output interface and output label of the active path to the output interface and output label of the backup path and forwards traffic. At step 689, the core node 171 sends a fault notification to the transport control server 100 and the edge nodes 151 to 155. Information in the fault notification includes the ID of the link in which the fault occurred.

Figure 15:
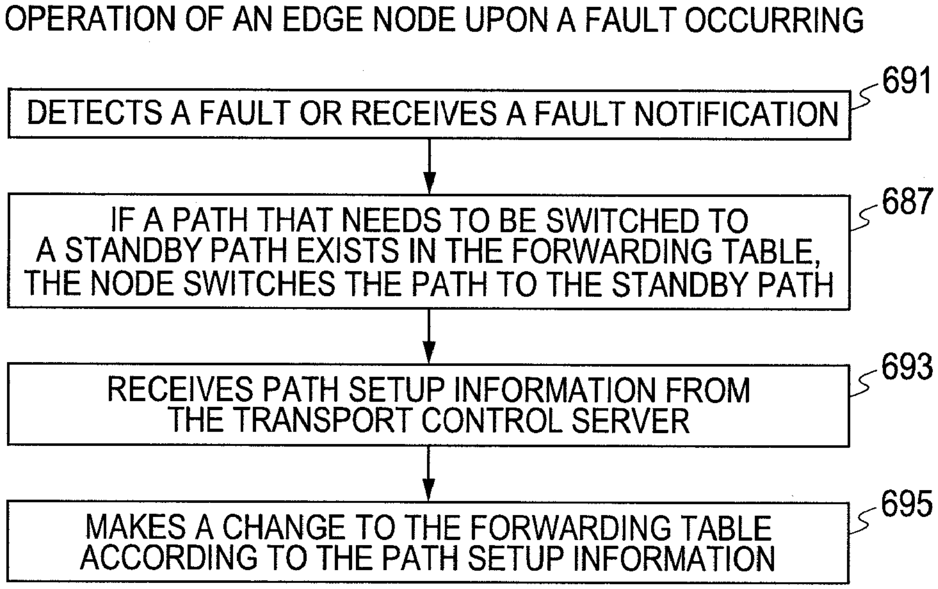
FIG. 15 is a flowchart of a process of an edge node upon a fault occurring.

FIG. 15 illustrates a flowchart of a process of an edge node upon a fault occurring. By way of example, the process of an edge node 151 is described. The same applies to other edge nodes.

At step 691, the edge node 151 detects that a fault has occurred in a link e through which an outgoing path from the node passes or receives a fault notification from the core node 171 that detected the fault. At step 687, the edge node 151 refers to the forwarding table managed therein and decides whether there is an active path that passes through the faulty link detected and a backup path alternative to the active path was set up. If there is such an active path for which a backup path was set up, the node switches the output interface and label from the output interface and output label of the active path to the output interface and output label of the backup path and forwards traffic.

At step 693, the edge node 151 receives a setting change notification from the transport control server 100. The setting change notification includes the values of the input label and interface and the output label and interface of the affected backup path and the values of the input label and interface and the output label and interface of the new backup path. At step 695, the edge node 151 makes a change to the forwarding database according to the setting change notification received in step 693.

Figure 16:
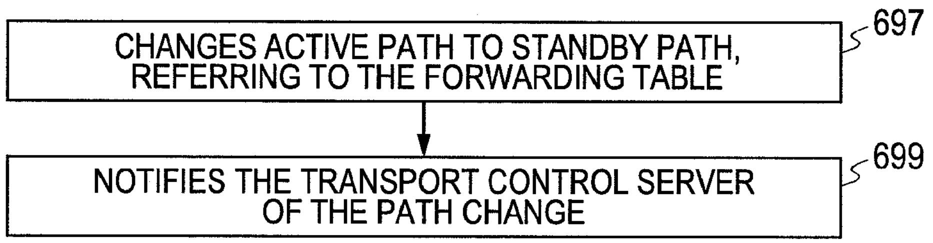
FIG. 16 is a flowchart of a process when an edge node changes a path.

FIG. 16 illustrates a flowchart of a process when an edge node 151 has changed a path.

At step 697, for example, upon a fault occurring on an active path, the edge node 151 autonomously changes the active path to a backup path, according to the forwarding table managed therein. In particular, the node switches the output interface and label from the output interface and output label of the active path to the output interface and output label of the backup path and forwards traffic. At step 699, the edge node 151 notifies transport control server 100 of the path change. This notification includes the ID of the path changed to the backup path.

Figure 17:
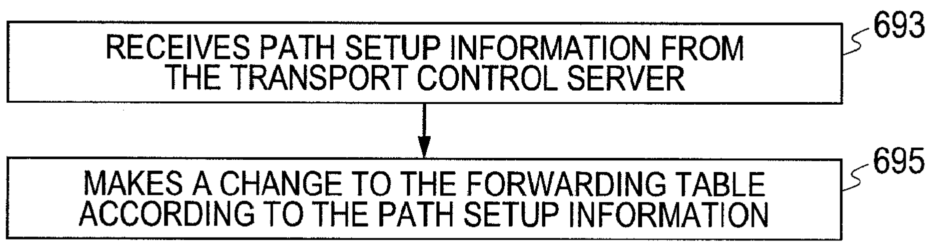
FIG. 17 is a flowchart of a process when an edge node receives a setting change notification.

FIG. 17 illustrates a flowchart of a process when an edge node 151 receives a setting change notification.

At step 693, the edge node 151 receives a setting change notification from the transport control server 100. The setting change notification includes the values of the input label and interface and the output label and interface of the affected backup path, which are to be deleted, and the values of the input label and interface and the output label and interface of the new backup path, which are to be added. At step 695, the edge node 151 makes a change to the forwarding database according to the setting change notification received in step 693.

[A Configuration Example of the Transport Control Server]

A transport control server of the present embodiment, for example, in a network system including multiple nodes and the transport control server, in which a node forwards data according to path setting information notified from the transport control server, the transport control server includes:

a path setup unit for managing and setting active paths which are normally used, backup paths which are used in case of a fault, and candidate paths which are used when active and backup paths have become unavailable;

a routes and resources calculating unit path for calculating path routes and bandwidths that should be secured;

a bandwidth sharing decision unit for managing bandwidth sharing by plural backup paths;

a fault processing unit for performing fault processing, when receiving a fault notification in the network;

a message transceiving unit for transmitting and receiving a message to/from each of the nodes, a path information storing unit for storing information for paths;

a topology information storing unit for storing topology information; and a bandwidth information storing unit for storing bandwidth information for links.

The transport control server calculates a backup path switched over to from an active path due to a path change or a fault, based on information in a path change notification or a fault notification, identifies a backup path affected by the switchover from the active path to the backup path, identifies nodes in which a setting change is needed, and transmits a setting change notification to the nodes.

In the above transport control server, for example, when calculating a backup path switched over to from an active path due to a fault in the network system, the fault processing unit calculates an active path passing through the fault point and a backup path to which the active path is switched, referring to topology information and path information in combination.

In the above transport control server, for example, when identifying a backup path affected by the switchover from the active path to the backup path in the network system, the bandwidth sharing decision unit calculates links through which the active path passing through the fault point passes and links through which the backup path to which the active path is switched passes by referring to topology information and path information in combination and finds an affected backup path by referring to other backup paths passing through the links.

The above transport control server, for example, when identifying nodes in which a setting change is needed in the network system, calculates an affected backup path that becomes unavailable, finds nodes through which the unavailable backup path passes, thereby finding the nodes in which a setting change is needed.

In the above transport control server, for example, once having identified the backup path affected by the switchover from the active path to the backup path in the network system, the path setup unit finds an available backup path from candidate paths as an alternative to the unavailable backup path by referring to topology information and path information in combination without performing path finding.

In the above transport control server, for example, when calculating a backup path switched over to from an active path due to a fault in the network system, the fault processing unit decides whether calculating an active path and a backup path according to a fault notification received is already done, referring to topology information. This avoids recalculating an active path and a backup path according to fault notifications about the same fault from a plurality of nodes.

In the above transport control server, for example, when identifying a backup path affected by the switchover from the active path to the backup path due to a path change in the network system, the fault processing unit calculates links through which the active path and the backup path to which the active path is switched pass by referring to topology information and path information in combination and finds a backup path that becomes unavailable by referring to other backup paths passing through the links.

The present invention can be applied to, for example, a network system where plural backup paths may share the bandwidth of a link.

What is claimed is:

1. A path control server for controlling a plurality of nodes in communication with the path control server, the path control server comprising one or more processors programmed with logic configured to:

receive a notification from a first node of the plurality of nodes, determine from the notification whether any of the plurality nodes in a third path are affected by the notification resulting in a path switch from a first path to a second path, identify one or more of the plurality of nodes in the third path to be notified of a setting change to delete the third path resulting from the path switch, the third path being different from the first and second paths and sharing at least one link with the second path, and notify the one or more of the plurality of nodes on the third path to perform the setting change to delete the third path.

2. The path control server of claim 1, wherein the one or more nodes on the third path is joined to the at least one link shared with the second path, and wherein the third path and the second path share a bandwidth on the at least one link.

3. The path control server of claim 1, wherein the path control server receives the notification from any of the plurality of nodes.

4. The path control server of claim 1, wherein the notification comprises a notification of an occurrence of a failure in the first path.

5. The path control server of claim 4, wherein the failure comprises a link failure or a node failure in the first path.

6. The path control server of claim 1, wherein the first path is an active path, the second path is an alternative path for the active path, and the third path is another alternative path for another active path.

7. The path control server of claim 1, further configured to determine whether the third path has a sufficient bandwidth.

8. The path control server of claim 1, further configured to identify the first path and the second path based on the notification.

9. The path control server of claim 1, wherein the notification comprises at least one of a label of an active path, a label of an alternative path, tag information of the active path, tag information of the alternative path, and an identifier of a node that switched the active path to the alternative path.

* * * * *